United States Patent [19]

Schimmel et al.

[11] Patent Number: 4,806,324

[45] Date of Patent: Feb. 21, 1989

[54] PROCESS FOR MAKING PHOSPHORIC ACID FREE FROM TITANIUM

[75] Inventors: Günther Schimmel; Reinhard Gradl, both of Erftstadt; Klaus Schrödter, Cologne, all of Fed. Rep. of Germany

[73] Assignee: Hoechst Aktiengesellschaft, Frankfurt am Main, Fed. Rep. of Germany

[21] Appl. No.: 152,751

[22] Filed: Feb. 5, 1988

[30] Foreign Application Priority Data

Feb. 18, 1987 [DE] Fed. Rep. of Germany ....... 3705069

[51] Int. Cl.$^4$ ............................................. C01B 25/16
[52] U.S. Cl. ............................. 423/321 S; 423/321 R
[58] Field of Search ........................ 423/321 S, 321 R

[56] References Cited

U.S. PATENT DOCUMENTS 3,529,932  9/1970  Imoto et al. .................... 423/321 S
4,018,869  4/1977  Beltz et al. ..................... 423/321 S
4,117,092  9/1978  Beltz et al. ..................... 423/321 S

FOREIGN PATENT DOCUMENTS 1075878  4/1980  Canada .
1667746  7/1973  Fed. Rep. of Germany .
2229602  9/1973  Fed. Rep. of Germany .
2538720  3/1977  Fed. Rep. of Germany .
1326911  8/1973  United Kingdom ............ 423/321 S Primary Examiner—Gregory A. Heller

[57] ABSTRACT

Phosphoric acid substantially free from titanium is made from the organic extract obtained by subjecting crude phosphoric acid containing titanium to extractive purification with an organic solvent immiscible or only partially miscible with water. To this end, the organic extract is scrubbed in a scrubbing zone with a stage number of $n>4$ by introducing the crude extract into stage 1 and scrubbing it countercurrently with an aqueous alkaline solution in one of stages 2 to $n-2$ and with pure scrubbing water in stage n.

3 Claims, No Drawings

PROCESS FOR MAKING PHOSPHORIC ACID FREE FROM TITANIUM

This invention relates to a process for making phosphoric acid substantially free from titanium by subjecting crude phosphoric acid containing titanium to extractive purification with an organic solvent immiscible or only partially miscible with water, subjecting the organic extract phase separated from the aqueous raffinate to multi-stage scrubbing treatment, and re-extracting the purified phosphoric acid from the extract phase by means of water.

To-date, very pure high grade phosphoric acid can be made by following the so-called thermal route but also from crude phosphoric acid obtained by processing crude phosphate with sulfuric acid, i.e. by the so-called extraction purification process. In this process, the crude acid is extracted using a solvent immiscible or only partially miscible with water, e.g. a $C_4$-$C_6$-alcohol, and a crude extract containing the alcoholic phosphoric acid solution is obtained.

The crude extract still contains traces of cations and a good deal of contaminating anions which can be more or less extensively removed by subjecting the crude extract to multi-stage scrubbing treatment.

Such scrubbing treatment in n-stages is generally effected in countercurrent fashion, i.e. by metering the crude extract into the first stage and the scrubbing solution into the $n^{th}$ stage, countercurrently with respect to one another.

The scrubbing solution used may be water or phosphoric acid but also an alkaline sodium hydroxide or sodium phosphate solution. This has been disclosed e.g. in German Specification DE-B No. 22 29 602 and DE-A No. 25 38 720. In this connection, it is generally accepted that the use of an alkaline scrubbing solution permits the scrubbing efficiency to be improved, and especially the anionic contaminants to be more effectively removed.

While this scrubbing treatment where sodium hydroxide solution is introduced into the last scrubbing stage can indeed and advantageously be used for removing contaminants, the fact remains that a quantity of alkali corresponding to its solubility in the organic phase remains dissolved in the purified extract.

If the organic extract is subsequently re-extracted with sodium hydroxide solution for making a sodium phosphate solution, the Na-content is no problem. It is however a disturbing factor whenever it is desirable to obtain pure phosphoric acid by re-extracting it with water, as the acid will then naturally be found to be contaminated with Na-ions (up to 0.5 wgt % Na/wgt % $P_2O_5$). In accordance with various specifications, the Na-concentrations allowable for pure phosphoric acid are very low (e.g. less than 100 ppm Na; ppm stands for parts per million).

Practical experience has shown however the Ti-content of the extract to be only inadequately reduced if water or phosphoric acid are exclusively used as the scrubbing solution. This is belived to be due to the fact that titanium is present in the extract as an anionic $TiF_6^{2-}$ complex and the pertinent $H_2TiF_6$-acid has a distribution coefficient comparable to that of phosphoric acid.

This fact has already been referred to in German Specification DE-B No. 16 67 746, which claims priority from the same Japanese application as does U.S. Pat. No. 3,529,932 to Imoto et al, issued Sep. 22, 1970. As a remedy for this, it has been suggested that the Ti-content should be reduced by adding considerable quantities of a Fe(III) compound to the crude phosporic acid prior to extracting it. In this way, it is possible for the distribution coefficient for Ti to be strongly reduced.

The working method just described has however a serious disadvantage associated with it, namely that the increased Fe(III) concentration in the phosphoric acid heavily affects the extraction yield of $H_3PO_4$. All trivalent cations, especially Fe and Al, are known to produce such effect.

We have now found that the Ti-content can also be reduced satisfactorily by subjecting the extract to scrubbing treatment using an alkaline solution rather than water. This effect is probably due to the formation of a pair of ions to $Na_2TiF_6$. Scrubbing with Na-ions is however beset with the disadvantage that the purified extract is liable to absorb considerable quantities of Na (cf. comprative Example 2 hereinafter).

It is therefore an object of this invention to provide a process permitting the Ti-content of a wet process phosphoric acid solution in an organic solvent immiscible or scarcely miscible with water to be reduced by the addition of alkali ions without the alkali-content in the extract becoming increased.

These are organic phosphoric acid solutions of the kind obtained during the extractive purification of wet-process phosphoric acid, which normally contains at least 9 wgt % $P_2O_5$.

We have now unexpectedly found that this object can be effectively achieved in simple fashion by subjecting the organic extract phase in a scrubbing zone with a stage number n>4 while introducing the crude extract into stage 1 and scrubbing it countercurrently with an aqueous alkaline solution in one of stages 2 to n−2 and with pure scrubbing water in stage n.

The alkaline solution should preferably be used in a quantity of 0.5 to 2.0 wgt %, calculated as Na and based on the $P_2O_5$ in the extract, and the scrubbing water should be used in a quantity of $\geq 30+2\times(\% Na/P_2O_5$ in extract) based on the $P_2O_5$ in the extract.

The alkaline solution preferably is a sodium hydroxide or sodium phosphate solution.

The alkaline solution should conveniently be introduced direct into the mixing zone of the mixer/settler scrubbing stage. In this way, it is possible by the addition of an alkali (a) to transform the titanium into the aqueous phase and (b) to remove the sodium completely in the stages lying between the alkali admission point and stage n.

As a result of the modified concentration ratios in the mixer, which is fed with sodium hydroxide solution (stage a=2 to n−2), the extract is here partially reextracted and its water content reduced. Now then, if a customary but insufficient quantity is metered into stage n, the organic phase predominantly becomes saturated with water in the stages between a and n, but there is no formation of an aqueous raffinate nor scrubbing effect whatsoever. In other words, in contrast to scrubbing exclusively with the use of water, it is invariably necessary to use more scrubbing water for scrubbing with an alkaline liquor/water-combination.

These facts are illustrated in greater detail in the following Examples. The percentages are by weight unless otherwise stated. Green crude phosphoric acid containing 49.5% $P_2O_5$ is obtained after reduction of the contents of sulfate and organic impurities in known manner by treatment with $Ca(OH)_2$ and active carbon. Next, the prepurified acid is extracted with amyl alcohol in a counter-current unit (A) comprising 8 stages and in a second unit (B) comprising 4 stages, concentrated sulfuric acid flowing countercurrently with respect to the phosphoric acid being additionally metered into the 7th mixer stage of unit (A). The resulting solvent phases containing phosphoric acid, termed crude extracts A and B hereinafter, are scrubbed with sodium hydroxide solution and/or water in a mixer/settler unit comprising 10 stages (Examples 1–6) and 5 stages (Examples 7–10).

The scrubbing liquid, termed scrubbed raffinate, coming from stage 1 is recycled into the 1st extraction stage. The steps of extracting and scrubbing are effected concurrently and continuously until complete establishment of the state of equilibrium. The exact parameters and results are summarized in the Table hereinafter.

EXAMPLE 1 (COMPARISON, CRUDE EXTRACT A)

Crude phosphoric acid made from Morocco phosphate was extracted and a crude extract containing 14.2% $P_2O_5$, 7 ppm titanium and 9 ppm Na was obtained. 31.7% $H_2O/P_2O_5$ was introduced into the 10th scrubbing stage. The purified extract taken from this stage contained 12.3% $P_2O_5$, 5 ppm Na and 5 ppm Ti. Ti was found to have been removed to an insignificant extent (17.5%).

EXAMPLE 2 (COMPARISON, CRUDE EXTRACT A)

The procedure was as in Example 1, but sodium hydroxide solution of 12% strength, namely 2.85% $NaOH/P_2O_5$, was substituted for the water. The purified extract contained 11.4% $P_2O_5$, 400 ppm Na and less than 1 ppm Ti. The Na-content of 3509 ppm/$P_2O_5$ is not allowable for a pure acid.

EXAMPLE 3 (COMPARISON, CRUDE EXTRACT A)

Morocco crude oil was extracted and a crude extract containing 14.3% $P_2O_5$, 5.5 ppm Ti and 95 ppm Na was obtained. Sodium hydroxide solution of 50 % strength was metered at a rate of 2.89% $NaOH/P_2O_5$ into stage 5 of the scrubbing unit, and water was metered at a rate of 31.7% $H_2O/P_2O_5$ into stage 10 of the scrubbing unit.

The purified extract taken from stage 10 contained 11.5% $P_2O_5$, 19 ppm Na and 0.5 ppm Ti. The settlers of stages 6 and 7 were found to be free from aqueous phase and therefore failed to produce a scrubbing effect resulting in a Na-content of 165.2 ppm/$P_2O_5$ which is too high. The quantity of water used was too low.

EXAMPLE 4 (INVENTION, CRUDE EXTRACT A)

The procedure was as in Example 3 but the quantity of scrubbing water in stage 10 was increased to 36.1% $H_2O/P_2O_5$. The purified extract contained 11.55% $P_2O_5$, 6.3 ppm Na and 0.4 ppm Ti.

EXAMPLE 5 (INVENTION, CRUDE EXTRACT A)

The procedure was as in Example 4 but less sodium hydroxide solution was used (in stage 6); as a result, less scrubbing water was indeed required to be used but the purified extract was found to contain 9.3 ppm Ti/$P_2O_5$.

EXAMPLE 6 (INVENTION, CRUDE EXTRACT A)

The procedure was as in Example 4 but more Na and more scrubbing water was used, and the sodium hydroxide solution was introduced into stage 3 of the scrubbing unit. A purified extract with a satisfactorily low content of Na and Ti was obtained. The Na-final value was practically reached already in stage 7 (cf. Table).

EXAMPLE 7 (COMPARISON, CRUDE EXTRACT B)

Morocco crude acid was extracted and a crude extract containing 11.2% $P_2O_5$, 57 ppm Na and 3.1 ppm Ti was obtained. Sodium hydroxide solution of 50% strength was metered at a rate of 2.11% $NaOH/P_2O_5$ into stage 3 of the scrubbing unit and water was metered at a rate of 32% $H_2O/P_2O_5$ into stage 5 of the scrubbing unit. The purified extract taken from stage 5 contained 9.0% $P_2O_5$, 0.6 ppm Ti and 17 ppm Na. The quantity of scrubbing water was too low.

EXAMPLE 8 (INVENTION, CRUDE EXTRACT B)

The procedure was as in Example 7 but the quantity of scrubbing water was increased to 34.5% $H_2O/P_2O_5$. The purified extract contained 9.4% $P_2O_5$, 5.5 ppm Na and 0.6 ppm Ti.

EXAMPLE 9 (INVENTION, CRUDE EXTRACT B)

The procedure was as in Example 8 but the sodium hydroxide solution was metered into stage 2. The purified extract contained 9.0% $P_2O_5$, 5 ppm Na and 0.6 ppm Ti.

EXAMPLE 10 (INVENTION, CRUDE EXTRACT B)

Kola crude acid was extracted and a crude extract containing 13.1% $P_2O_5$, 28 ppm Ti and 210 ppm Na was obtained. Sodium hydroxide solution of 50% strength, at a rate of 1.80% $NaOH/P_2O_5$, and water, at a rate of 35% $H_2O/P_2O_5$, were metered into stage 2 of the scrubbing unit comprising 5 stages. The purified extract taken from stage 5 contained 11.4% $P_2O_5$, 1.1 ppm Ti and 7 ppm Na.

TABLE

| Example | Conc. NaOH (%) | Quantity Na/$P_2O_5$ (wgt %) | Quantity $H_2O/P_2O_5$ (wgt %) | NaOH metered into stage | $H_2O$ metered into stage | number of scrubbing stages | Concentration based on $P_2O_5$ | | | |
|---|---|---|---|---|---|---|---|---|---|---|
| | | | | | | | in crude extract | | purified extract | |
| | | | | | | | ppm Na | ppm Ti | ppm Na | ppm Ti |
| 1 | 0 | 0 | 31.7 | — | 10 | 10 | 63.4 | 49.3 | 40.7 | 40.7 |
| 2 | 12 | 1.63 | 0 | 10 | — | 10 | 1095 | 58.4 | 3509 | <8.8 |
| 3 | 50 | 1.66 | 31.7 | 5 | 10 | 10 | 664 | 38.5 | 165.2 | 4.3 |
| 4 | 50 | 1.66 | 36.1 | 5 | 10 | 10 | 736 | 32.5 | 54.6 | 3.5 |
| 5 | 30 | 0.57 | 31.7 | 6 | 10 | 10 | 270 | 43.8 | 43.5 | 9.3 |
| 6 | 50 | 1.66 | 38.7 | 3 | 10 | 10 | 778 | 32.1 | 43.1 | 3.4 |

TABLE -continued

| Example | Conc. NaOH (%) | Quantity Na/P$_2$O$_5$ (wgt %) | Quantity H$_2$O/P$_2$O$_5$ (wgt %) | NaOH metered into stage | H$_2$O metered into stage | number of scrubbing stages | Concentration based on P$_2$O$_5$ ||||
|---|---|---|---|---|---|---|---|---|---|---|
| | | | | | | | in crude extract || purified extract ||
| | | | | | | | ppm Na | ppm Ti | ppm Na | ppm Ti |
| 7 | 50 | 1.21 | 32.0 | 3 | 5 | 5 | 509 | 27.8 | 189 | 6.7 |
| 8 | 50 | 1.25 | 34.5 | 3 | 5 | 5 | 200 | 30.6 | 58.3 | 6.4 |
| 9 | 50 | 1.21 | 34.5 | 2 | 5 | 5 | 391 | 30.2 | 55.8 | 6.7 |
| 10 | 50 | 1.03 | 34.0 | 2 | 5 | 5 | 1603 | 214 | 61.4 | 9.7 |

We claim:

1. In the process for making phosphoric acid substantially free from titanium by subjecting crude phosphoric acid containint titanium to extractive purification with an organic solvent immiscible or only partially miscible with water, subjecting the organic extract phase separated from the aqueous raffinate to multi-stage scrubbing treatment, and re-extracting the purified phosphoric acid from the extract phase by means of water, the improvement which comprises; scrubbing the organic extract phase in a scrubbing zone with a stage number of n>4 by introducing the crude extract into stage 1 and scrubbing it countercurrently with an aqueous alkaline solution in one of stages 2 to n−2 and with pure scrubbing water in stage n, whereby the aqueous alkaline solution is used in a quantity of 0.5 to 2 wgt %, calculated as Na and based on the P$_2$O$_5$ contained in the extract.

2. The process as claimed in claim 1, wherein the scrubbing water in stage n is used in a quantity of $\geq 30 + 2 \times (\%\text{Na}/\text{P}_2\text{O}_5)$, based on the P$_2$O$_5$ contained in the extract.

3. The process as claimed in claim 1, wherein the aqueous alkaline solution used is a sodium hydroxide or sodium phosphate solution.

* * * * *